May 8, 1962   J. NEMEC   3,033,060
SPEED REDUCING AND REVERSING MECHANISM
Filed Dec. 30, 1959   2 Sheets-Sheet 2

INVENTOR
Joseph Nemec
BY
ATTORNEYS

United States Patent Office 3,033,060
Patented May 8, 1962

3,033,060
SPEED REDUCING AND REVERSING
MECHANISM
Joseph Nemec, 367 Tait St., St.-Laurent, Quebec, Canada, assignor of fifty percent to Nicolas Monastyrsky, Montreal, Quebec, Canada
Filed Dec. 30, 1959, Ser. No. 862,925
6 Claims. (Cl. 74—804)

The present invention relates to a speed-reducing and reversing mechanism. The invention is particularly applicable to spinning-type fishing reels with cross-line winding.

Reels of this type comprise an outrider which rotates about a nearly stationary spool, and guides the line about the spool to wind the same thereon. The axis of the spool is inclined to the axis of rotation of the outrider, and speed-reducing and reversing mechanism must be provided to impart to the spool a very slow movement in a direction opposite to the outrider, in order that the line may be distributed evenly all over the surface of the spool.

Since the speed ratio between the outrider and the spool is rather high, conventional speed-reducing and reversing mechanisms, as used hitherto in spinning reels of this type, are bulky and expensive. It is an object of the present invention to provide a highly simplified, yet positive and efficient mechanism for driving the spool directly from the outrider support. It will be understood, however, that the invention is not limited in its use to a fishing reel, but may be employed for many other purposes.

The mechanism in accordance with the invention consists essentially of a pinion which is the driven member, a floating internal gear wheel having a greater number of teeth than the pinion, and a member which rotates around the pinion and keeps the internal gear wheel in continuous engagement with the pinion. With such an arrangement the pinion is caused to rotate in a direction opposite to said member, and at a reduced angular velocity with respect to the member, the velocity of the pinion being in a ratio of $$\frac{N_2 - N_1}{N_2}$$

with respect to the velocity of the member, wherein $N_2$ is the number of teeth of the internal gear and $N_1$ is the number of teeth of the pinion.

An explanation of how this result is obtained will be given hereinafter with reference to the drawings; let it be noted, however, that the device is only operative if the internal gear is not entrained in rotation along with the member. Means must, therefore, be provided to prevent rotation of the internal gear wheel, unless the torque resistance of the pinion or friction of the internal gear wheel is sufficient to prevent its rotation.

An embodiment of the invention is illustrated in the accompanying drawings, in which.

Figure 1:
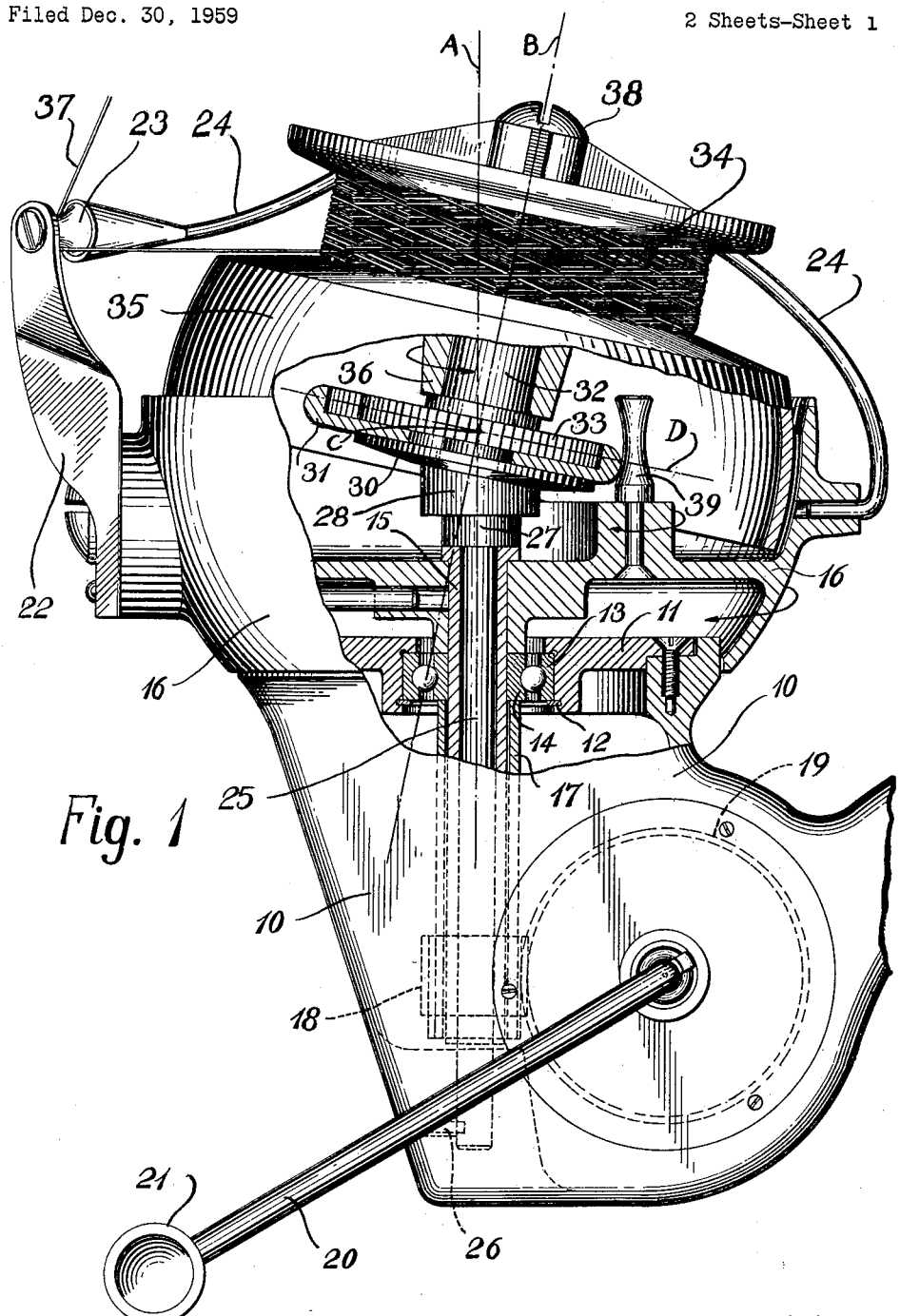
FIGURE 1 is a side elevation, partly in section, of a spinning-type fishing reel to which is applied the speed reducing device according to the invention.

The fishing reel to which the invention is applied comprises a body 10 secured to the fishing rod (not shown). Screwed to the top open end of body 10 is a collar 11, to which is secured by means of a snap ring 12 the outer race 13 of a ball bearing. The inner race 14 of the ball bearing is secured to a tubular shaft 15 on which is also fastened, at its outer end a cup shaped support 16 and at its inner end a sleeve 17. Sleeve 17 has attached thereto at its lower end a small helical gear 18 which is in engagement with a large right angle helical gear 19 cranked by an arm 20 comprising a handle 21. The gear ratio of small gear 18 and larger gear 19 is such that the angular velocity of tubular shaft 15 is greater than that of arm 20.

The cup shaped support 16 comprises a bracket 22 to which is fastened an outrider 23 extending into a guide rod 24 which connects back to the support 16.

Figure 6:
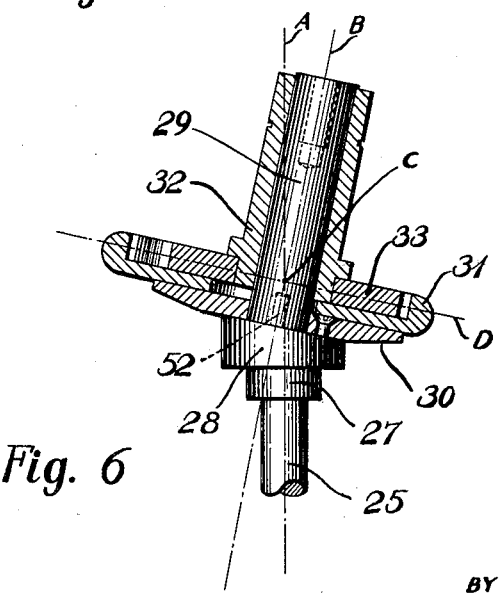
FIGURE 6 is a fragmentary longitudinal section of the speed-reducing device and related parts, shown in the same position, as in FIGURE 1.

The tubular shaft 15 rotates with respect to a main shaft 25 which is contained in the hollow of shaft 15, and which projects beyond the lower end of tubular shaft 15 and is secured to the body 10 by means of a screw 26. At its top end the shaft 25 extends past the top of tubular shaft 15 into integral collars 27 and 28. The top collar 28 has an inclined top surface to which are secured a secondary shaft 29 (FIG. 6) and a head plate 30.

The head plate 30 has floating thereon an internal gear wheel 31. Rotatably mounted on the secondary shaft 29 is a sleeve 32, to which is fastened a pinion 33. As shown in FIGURE 1, the spool 34, which is integral with a skirt 35, is mounted on the sleeve 32 by means of a sleeve 36.

The axis of shaft 25 and of tubular shaft 15, which is the axis of rotation of the cup shaped support 16 and of outrider 23, is indicated at A. The axis B, which is the axis of rotation of the spool 34, is inclined to the axis A at an angle determined by the axial extent of the spool, this angle being equal to that between a plane perpendicular to axis B and a plane passing through diametrically opposite points at opposite ends of the spool 34. In this manner the line 37 will be wound on the spool 34 in such a way as to touch both opposite ends of the spool 34.

A screw 38 engaging the outer end of secondary shaft 29 keeps the parts in assembly relation.

The axes A and B coincide at a point C which lies in the central plane D of pinion 33 and internal gear 31. On the cup shaped support 16 is also mounted an upstanding stud 39 which is in contact with the rounded rim of internal gear wheel 31. The stud 39 is formed as a concave surface of revolution, the longitudinal sectional circumference of which is centered at the point of intersection C of axes A and B. In this manner the stud 39 is in continuous engagement with the outer rim of internal gear wheel 31 and as the cup shaped support 16 is rotated, it brings the portion of gear wheel 31 adjacent thereto into engagement with the pinion 33, as clearly shown in FIGURES 2 to 5.

Figure 2:
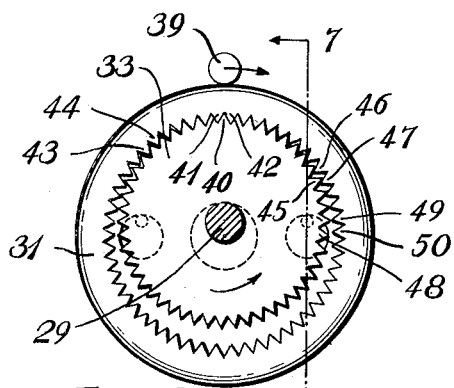
FIGURES 2, 3, 4 and 5 are schematical plan views of the speed-reducing mechanism proper, shown in several different positions.
Figure 3:
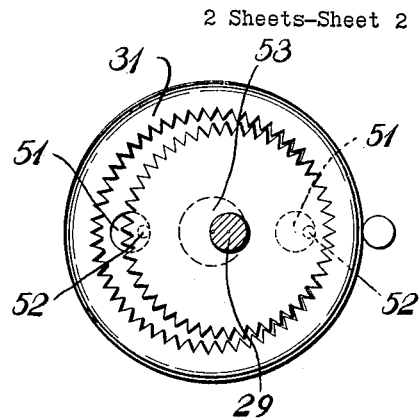
Figure 4:
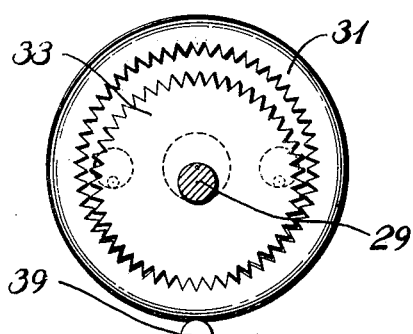
Figure 5:
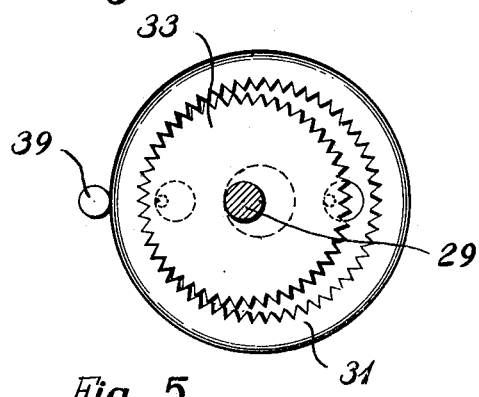

The means for preventing rotation of the internal gear wheel 31 will be explained later; assuming such means to be provided, the functioning of the speed-reducing and reversing mechanism is as follows: In the embodiment shown the internal gear wheel 31 has fifty-four teeth whereas the pinion 33 has forty-eight teeth. In the position of FIGURE 2 the tooth 40 of the pinion 33 is engaged in the space between teeth 41 and 42 of the internal gear 31. As the stud 39 rotates clockwise it brings each adjacent tooth of the pinion into engagement with each adjacent tooth space of the internal gear 31. After one full rotation of the stud 39 therefore the tooth 40 will no longer be engaged with teeth 41, 42 but with teeth 43, 44, namely tooth 40 will have been set back counter-clockwise by six tooth spaces of gear 31, six being the difference between fifty-four and forty-eight, the number of teeth of the internal gear and of the pinion respectively. Consequently, the pinion 33 is rotated in a direction opposite that of stud 39 and during one rotation of the stud 39 the pinion 33 will have turned through 9/54, namely, 1/6 of a turn. The ratio of the angular velocity of the pinion 33 with respect to that of stud 39 is therefore 1/9.

More generically, if $N_1$ is the number of teeth of the pinion 33, $N_2$ the number of teeth of internal gear 31, $V_1$ the angular velocity of pinion 33 and $V_2$ the angular velocity of stud 39, the ratio of velocities is as follows:

$$V_1 = V_2 \frac{N_2 - N_1}{N_2}$$

The above-described operation will be understood more clearly by considering in FIGURE 2 the teeth towards the right of tooth 40. Consider, for example, tooth 45. It can already be seen that a certain amount of counter clockwise rotation of pinion 33 is required for it to enter into the space between teeth 46 and 47. The effect becomes more pronounced with the next two teeth and is unmistakable with the following tooth 48 which, it can be seen, is destined for the space between teeth 49 and 50, yet in the position of FIGURE 2 is ahead of said space.

In the present arrangement the tension of the line on the spool 34 would cause the same to be rotated clockwise, together with the sleeve 32 and pinion 33, unless means were provided to prevent the internal gear wheel 31 from rotating together with the stud 39. For this purpose the wheel 31 comprises a pair of circular holes 51 at equal distances from the centre of gear wheel 31, and with their centres on the same diameter. Two pins 52, also shown in FIGURE 7, project from the face of head plate 30 and extend into holes 51. The tops of pins 52 are flush with the upper face of wheel 31. The pins 52 are disposed on a common circumference centred at the intersection of axis B of the secondary shaft 29 with the top surface of head plate 30, and are diametrically opposite on said circumference. The circumference is of a diameter equal to the spacing between the centres of holes 51. Each hole 51 has a diameter equal to the difference of the pitch diameters of the internal gear 31 and of pinion 33 plus the diameter of pin 52. As the stud 39 rotates the pins 52 circle about the periphery of holes 51, thus preventing rotation of the internal gear wheel 31.

Wheel 31 also comprises a central clearing hole 53 to clear the shaft 29. The diameter of hole 53 must be at least equal to the difference of the pitch diameters of wheel 31 and pinion 33, plus the diameter of the secondary shaft 29, in order to clear completely the shaft 29 as the wheel 31 is shifted around by stud 39.

Figure 7:
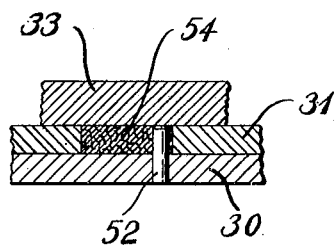
FIGURE 7 is a fragmentary section on line 7—7 of FIGURE 2.

As shown in FIGURE 7, each hole 51 contains a freely rotatable insert 54 which occupies all of the space of the hole except for the pin 52. The purpose of the insert 54 is to retain positively the pin 52 against the wall of hole 51.

It should be noted that the mechanism is fully operative even if only one eccentric hole 51 and one pin 52 is provided.

The embodiment of the invention which has been illustrated and described is given merely by way of example and various modifications are possible within the scope of the appended claims.

I claim:
1. A speed-reducing and reversing mechanism comprising: a support rotatable about a first axis; means to drive said support in one direction; a pinion rotatable about a second axis which intersects said first axis at an angle; said pinion having $N_1$ teeth; a floating internal gear having $N_2$ teeth, $N_2$ being greater than $N_1$; a stud secured to said support and engaging the outer periphery of said internal gear wheel and maintaining said floating internal gear in continuous engagement with said pinion; means retaining said internal gear wheel to prevent its rotation together with said stud; whereby said pinion is rotated in opposite direction to said stud at a speed ratio of

$$\frac{N_2 - N_1}{N_2}$$

with respect to said stud.

2. A speed-reducing and reversing mechanism comprising: a fixed main shaft; a support borne by said main shaft; means to rotate said support in one direction; a secondary shaft secured to the end of said main shaft at an angle thereto; a pinion rotatable about said secondary shaft and having a central plane passing through the intersection of the axis of said main and said secondary shafts; said pinion having $N_1$ teeth; a head plate near the end of said shaft, perpendicular to said secondary shaft; an internal gear wheel having $N_2$ teeth floating on said head plate, $N_2$ being greater than $N_1$; a stud secured to said support, engaging the outer periphery of said gear wheel; said stud being formed as a concave surface of revolution, the longitudinal sectional circumference of which is centered at said intersection of the axis of said main and said secondary shafts; whereby said stud maintains said floating internal gear wheel in continuous engagement with said pinion; means on said head plate retaining said internal gear wheel to prevent its rotation together with said stud; whereby said pinion is rotated in opposite direction to said support at a speed ratio of $$\frac{N_2 - N_1}{N_2}$$

with respect to said support.

3. A spinning fishing reel according to claim 2, wherein said retaining means consists of at least one hole on, and eccentric to, said internal gear wheel, a pin secured to said head plate and extending through said hole, said pin being disposed on a circumference centred on the axis of said secondary shaft and passing through the centre of said hole when the internal gear wheel is concentric with the pinion, said hole having a diameter at least equal to the difference of the pitch diameters of the internal gear and pinion plus the diameter of said pin.

4. A spinning fishing reel according to claim 2, wherein said retaining means consists of two holes on said internal gear wheel located at equal distances from the centre of, and on a common diameter of, said internal gear wheel; two pins secured to said head plate and extending each through one of said holes; said pins being disposed diametrically opposite on a circumference centred on the axis of said secondary shaft and of diameter equal to the spacing of said holes, each said hole having a diameter equal to the difference of the pitch diameters of the internal gear and pinion, plus the diameter of said pin.

5. A spinning fishing reel according to claim 4, wherein said internal gear wheel further comprises a central hole clearing said secondary shaft, said central hole having a diameter at least equal to the difference of the pitch diameters of the internal gear and pinion, plus the diameter of said secondary shaft.

6. A spinning fishing reel according to claim 4, wherein each said hole contains an insert freely rotatable therein and occupying all the space free of said pin, thereby to retain the pin against the wall of said hole.

References Cited in the file of this patent

UNITED STATES PATENTS

| | | |
|---|---|---|
| 757,333 | Moore | Apr. 12, 1904 |
| 757,381 | Wright | Apr. 12, 1904 |
| 2,185,862 | Mestler | Jan. 2, 1940 |
| 2,209,201 | Hill | July 23, 1940 |
| 2,622,823 | Tlustos | Dec. 23, 1952 |
| 2,666,345 | Amberg | Jan. 19, 1954 |
| 2,863,336 | Parstorfer | Dec. 9, 1958 |
| 2,884,815 | Pittman | May 5, 1959 |

FOREIGN PATENTS

| | | |
|---|---|---|
| 894,624 | France | Mar. 20, 1944 |